United States Patent Office 2,734,880
Patented Feb. 14, 1956

2,734,880

COPOLYMER OF VINYL AROMATIC HYDROCARBON, DEHYDRATED CASTOR OIL ALKYD AND OIL ALKYD MADE FROM OILS HAVING ISOLATED DOUBLE BOND

Heinz Ehring, Krefeld, and Karl Raichle, Krefeld-Uerdingen, Germany, assignors to Farbenfabriken Bayer Aktiengesellschaft, Leverkusen, Germany, a corporation of Germany No Drawing. Application June 4, 1952,
Serial No. 291,798

Claims priority, application Germany June 29, 1951

16 Claims. (Cl. 260—22)

It is known to polymerise monomeric aromatic monovinyl hydrocarbons in the presence of alkyd resins containing the radicals of fatty acids on which drying oils are based to form valuable raw materials for quick-drying lacquer, while adding a solvent.

When adopting for this method alkyd resins comprising the radical of the dehydrated oil fatty acid, the reaction solutions tend to become very viscous, which readily causes gelatination, particularly when effecting the polymerisation in concentrated solutions or when concentrating dilute solutions. The same phenomena take place also on storage of the final products.

Furthermore, it is difficult to interpolymerise monomeric aromatic vinyl compounds, for instance styrene, with alkyd resins comprising acid radicals of unsaturated fatty acids with isolated double bonds to form lacquer raw materials producing homogeneous and clear films.

According to the present invention lacquer raw materials are obtained the solutions of which in general do not gelatinise. The resulting varnishes are distinguished, apart from the well known good properties of the styrene alkyd resins, by some particular properties, for instance a remarkable adherence. The process for manufacturing the new materials comprises interpolymerising monomeric aromatic mono-vinyl hydrocarbons with a mixture of alkyd resin comprising the acid radical of dehydrated castor oil and alkyd resin comprising the acid radical of an unsaturated fatty acid with isolated double bonds, in the presence of an inert solvent.

By the invention it is possible to polymerise polymerisation mixtures of the aforesaid kind which are very prone to gelatination, even with a high percentage of alkyd resins of the dehydrated castor oil type and a quantitative proportion of for instance one part by weight of alkyd resins to one part by weight of vinyl compound in a 30–60% solution, or to concentrate less concentrated solutions of the final product to the aforesaid concentrations by distillation of the solvent, without gelatination occurring.

The stability of the solutions during the storage as well as of coating compositions prepared thereof is almost unlimited. Furthermore, there is a remarkable compatibility of the solutions with basic pigments for instance lithopone, zinc oxide and red lead.

Coatings produced by the products are distinguished by a very short drying time, in general about 15 to about 30 minutes after adding a usual drier. The coatings have a remarkable resistance to light and weather and to water and chemicals such as acids and bases; they are elastic and permanent. Especially they have a surprising adherence particularly to metals, such as aluminum, and to plastics, for instance Bakelite and vulcanized fibre. They may be used as ground-colours and painted by other lacquers for instance nitrocellulose lacquers.

The dehydrated castor oil alkyd resins are those comprising the acid radical of the dehydrated castor oil acid obtainable in the known manner by reacting polyhydric alcohols, such as glycerol, and polybasic acids, such as phthalic acid or phthalic anhydride, with the dehydrated castor oil fatty acid itself or with the dehydrated castor oil as well as with the ricinoleic acid or with castor oil under conditions producing the dehydrated castor oil fatty acid radical by splitting off water, for instance at temperatures of about 250 to about 300° C.

Preferably such alkyd resins are used possessing a content of the dehydrated castor oil acid radical of about 40 to about 70%.

Dehydrated castor oil alkyd resins with a low viscosity, for instance such with a viscosity of 30 seconds, when tested as a 50% solution of xylene in the Ford cup No. 4 at 20° C., may be used. But even highly condensed alkyd resins of this type which readily tend to gelatinise, as for instance such with a viscosity of 200 to 300 seconds, when tested as a 50% solution in xylene in the Ford cup No. 4 at 20° C., also may be used. Special products may be obtained by mixing several alkyd resins of this type having different contents of the acid radical or different viscosities.

Among the alkyd resins, comprising the radicals of unsaturated fatty acids with isolated double bonds and which are introduced according to the invention, those containing the radicals of fatty acids of olive oil, soya oil, linseed oil, perilla oil, sunflower oil, cotton seed oil, peanut oil, or sardine oil may be mentioned as examples. Alkyd resins of this type also may have a very varied content of fatty acid radicals, and the viscosity of these resins may vary within large limits for instance within about 20 to about 200 seconds, when tested as a 50% solution in xylene in the Ford cup No. 4 at 20° C. Also mixtures of several alkyd resins of this type may advantageously be used. The amount of such alkyd resins to be added depends on the properties to be imparted to the final product, as for instance the rate of drying and viscosity, and which can be determined in each individual case by a simple test.

Suitable monomeric aromatic vinyl hydrocarbons are for instance styrene, o-, m- or p-alkyd styrene, for instance o-, m- or p-methyl styrene, styrenes halogenated in the nucleus, vinyl naphthalene and mixtures thereof, as well as mixtures with α-methyl styrene or as -diphenylethylene.

Suitable inert solvents are for instance toluene, xylene, solvent naphtha, ethyl benzene, oil of turpentine, lacquer benzine, or mixtures of these solvents.

The following examples are given for the purpose of illustrating the invention, the parts being by weight:

Example 1

496 parts of an alkyd resin of the dehydrated castor oil type (acid number 12, viscosity about 40 seconds, tested as a 50% solution in xylene in the Ford cup No. 4 at 20° C.) are prepared by heating to 260° C. in a known manner from 3200 parts of castor oil, 640 parts of glycerol, and 1200 parts of phthalic acid anhydride. 375 parts of an alkyd resin (acid number 12, viscosity about 40 seconds, tested as a 50% solution in xylene in the Ford cup No. 4 at 20° C.) are prepared by heating to 250° C., in a known manner from 2470 parts of linseed oil, 835 parts of glycerol and 1625 parts of phthalic acid anhydride. These are refluxed together with 870 parts of styrene and 1600 parts of solvent naphtha to about 140° C. for 35 hours.

After the reaction is completed, the styrene is converted to about 90%. The solution thus obtained possesses a content of solids of about 49%, a viscosity of 240 seconds, tested in the Ford cup No. 4 at 20° C., and has a good keeping quality. The films produced with this solution, after the addition of driers, dry within 15 minutes, exhibit a good gloss, high elasticity, great hardness and excellent resistance to water.

If in this example the 375 parts of linseed oil modified alkyd resin were replaced by the same amount of an alkyd resin of the dehydrated castor oil type, gelatination would start even after 18 hours with a styrene conversion of about 60%.

Example 2

A highly condensed alkyd resin of the dehydrated castor oil type with a fatty acid radical content of 47% (acid number 35, viscosity 200 seconds tested as a 50% solution in xylene in the Ford cup No. 4 at 20° C.) is prepared by heating to 260° C. in a known manner from 2230 parts of castor oil, 890 parts of glycerol as well as 1700 parts of phthalic acid anhydride. 620 parts of this alkyd resin are refluxed with 848 parts of styrene, 1530 parts of xylene as well as 462 parts of the linseed oil-modified alkyd resin described in Example 1, at about 145° C. for about 30 hours. The solution thus obtained has a content of solids of about 48% and a viscosity of 250 seconds, tested in the Ford cup No. 4 at 20° C. It has good keeping properties. After the addition of driers, the solution yields within an hour or so extremely hard clear and glossy films with a remarbable adherence, resistant to water and alkali.

If in this example the linseed oil-modified alkyd resin were replaced by xylene so that the reaction mixture contained 35% of alkyd resin and styrene, and this were refluxed at about 145° C. for 25 hours the resulting solution would have a content of about 33% of solids and a viscosity of 37, tested in the Ford cup No. 4 at 20° C. If this solution were concentrated to a content of solids of about 50% by distillation of the solvent, the viscosity would rise to about 650 seconds, tested in the Ford cup No. 4 at 20° C. On subsequent dilution with xylene to a content of solids of 33%, the solution would show a substantially higher viscosity than before the distillation. After about three months of storage, the solution, adjusted to about 50% would completely gelatinize.

Example 3

383 parts of an alkyd resin of the dehydrated castor oil type mentioned in Example 2 and 215 parts of an alkyd resin (acid number 7, viscosity about 60 seconds, tested as a 50% solution in xylene in the Ford cup No. 4 at 20° C.) prepared from 594 parts of soya oil, 216 parts of glycerol, as well as 432 parts of phthalic acid anhydride by heating to 250° C., are refluxed with 402 parts of styrene and 950 parts of xylene for 30 hours. The reaction solution thus obtained possesses a content of solids of about 45% and a viscosity of about 300 seconds, tested in the Ford cup No. 4 at 20° C. After the addition of driers, lacquers are obtained which dry within 15–30 minutes with excellent hardness and are resistant to light and weather.

Example 4

By replacing the soya oil-alkyd resin of Example 3 by the same quantity of a highly condensed alkyd resin prepared from 1692 parts of linseed oil, 1095 parts of glycerol and 2150 parts of phthalic anhydride with an acid number of 35 and a viscosity of 170 seconds, tested as a 50% solution in xylene in the Ford cup No. 4 at 20° C., and refldxing the mixture for 20 hours at 140° C., a reaction solution with an amount of solids of about 42% and a viscosity of 300 seconds, tested in the Ford cup No. 4 at 20° C., is obtained. The solution does not gelatinize. The films, produced by this solution after the addition of driers, dry very quickly within 15 minutes. They have an excellent hardness and a high stability in the can.

Example 5

A coating composition is prepared by mixing 450 parts of a resin obtained according to Example 2
20 parts of linseed oil
9 parts of cobalt lead manganese naphthenate (a 33% solution in xylene)
40 parts of turpentine
25 parts of white spirit
30 parts of ethylene glycol mono ethyl ether
534 parts of red lead
356 parts of barium sulfate and
20 parts of an antiskinning agent.

We claim:

1. The process which comprises interpolymerising a monomeric aromatic mono vinyl hydrocarbon with a mixture of alkyd resin comprising the acid radical of dehydrated castor oil and alkyd resin comprising the acid radical of an unsaturated fatty acid with isolated double bonds, in the presence of an inert solvent.

2. The process which comprises interpolymerising styrene with a mixture of alkyd resin comprising the acid radical of dehydrated castor oil and alkyd resin comprising the acid radical of an unsaturated fatty acid with isolated double bonds, in the presence of an inert solvent.

3. The process which comprises interpolymerising styrene with a mixture of alkyd resin comprising the acid radical of dehydrated castor oil and alkyd resin comprising the acid radical of linseed oil, in the presence of an inert solvent.

4. The process which comprises interpolymerising a monomeric aromatic vinyl hydrocarbon with a mixture of alkyd resin with a content of the dehydrated castor oil fatty acid radical between about 40 and about 70% and alkyd resin comprising the acid radical of an unsaturated fatty acid with isolated double bonds, in the presence of an inert solvent.

5. The process which comprises interpolymerising a monomeric aromatic mono vinyl hydrocarbon with a mixture of alkyd resin with a content of the dehydrated castor oil fatty acid radical between about 40 and about 70% and a viscosity of about 30 to about 300 seconds, when tested as a 50% solution in xylene in the Ford cup No. 4 at 20° C., and alkyd resin comprising the acid radical of an unsaturated fatty acid with isolated double bonds, in the presence of an inert solvent.

6. The process which comprises interpolymerising a monomeric aromatic mono vinyl hydrocarbon with a mixture of alkyd resin comprising the acid radical of dehydrated castor oil and alkyd resin comprising the acid radical of an unsaturated fatty acid with isolated double bonds with a viscosity between about 20 and about 200 seconds, when tested as a 50% solution in xylene in the Ford cup No. 4 at 20° C., in the presence of an inert solvent.

7. The process which comprises interpolymerising styrene with a mixture of alkyd resin with a content of the dehydrated castor oil fatty acid radical of 47% and a viscosity of 200 seconds, tested as a 50% solution in xylene in the Ford cup No. 4 at 20° C., and an alkyd resin comprising the linseed oil acid radical with a viscosity of 40 seconds, tested as a 50% solution in xylene in the Ford cup No. 4 at 20° C., in the presence of solvent naphtha.

8. The process which comprises interpolymerising about 4 parts by weight of styrene with a mixture of about 3.8 parts by weight of an alkyd resin with a content of a dehydrated castor oil fatty acid radical of 47% and a viscosity of 200 seconds tested as a 50% solution in xylene in the Ford cup No. 4 at 20° C., and about 2.2 parts by weight of an alkyd resin comprising the linseed oil acid radical with a viscosity of 170 seconds tested as a 50% solution in xylene in the Ford cup No. 4 at 20° C., in the presence of xylene.

9. A composition of matter formed by interpolymerising a monomeric aromatic mono vinyl hydrocarbon with a mixture of alkyd resin comprising the acid radical of dehydrated castor oil and alkyd resin comprising the acid radical of an unsaturated fatty acid with isolated double bonds, in the presence of an inert solvent.

10. A composition of matter formed by interpolymerising styrene with a mixture of alkyd resin comprising the acid radical of dehydrated castor oil and alkyd resin comprising the acid radical of an unsaturated fatty acid with isolated double bonds, in the presence of an inert solvent.

11. A composition of matter formed by interpolymerising styrene with a mixture of alkyd resin comprising the acid radical of dehydrated castor oil and alkyd resin comprising the acid radical of linseed oil, in the presence of an inert solvent.

12. A composition of matter formed by interpolymerising a monomeric aromatic vinyl hydrocarbon with a mixture of alkyd resin with a content of the dehydrated castor oil fatty acid radical between about 40 and about 70% and alkyd resin comprising the acid radical of an unsaturated fatty acid with isolated double bonds, in the presence of an inert solvent.

13. A composition of matter formed by interpolymerising a monomeric aromatic mono vinyl hydrocarbon with a mixture of alkyd resin with a content of the dehydrated castor oil fatty acid radical between about 40 and about 70% and a viscosity of about 30 to about 300 seconds, when tested as a 50% solution in xylene in the Ford cup No. 4 at 20° C., and alkyd resin comprising the acid radical of an unsaturated fatty acid with isolated double bonds, in the presence of an inert solvent.

14. A composition of matter formed by interpolymerising a monomeric aromatic mono vinyl hydrocarbon with a mixture of alkyd resin comprising the acid radical of dehydrated castor oil and alkyd resin comprising the acid radical of an unsaturated fatty acid with isolated double bonds with a viscosity between about 20 and about 200 seconds, when tested as a 50% solution in xylene in the Ford cup No. 4 at 20° C., in the presence of an inert solvent.

15. A composition of matter formed by interpolymerising styrene with a mixture of alkyd resin with a content of the dehydrated castor oil fatty acid radical of 47% and a viscosity of 200 seconds, tested as a 50% solution in xylene in the Ford cup No. 4 at 20° C., and an alkyd resin comprising the linseed oil acid radical with a viscosity of 40 seconds, tested as a 50% solution in xylene in the Ford cup No. 4 at 20° C., in the presence of solvent naphtha.

16. A composition of matter formed by interpolymerising about 4 parts by weight of styrene with a mixture of about 3.8 parts by weight of an alkyd resin with a content of a dehydrated castor oil fatty acid radical of 47% and a viscosity of 200 seconds tested as a 50% solution in xylene in the Ford cup No. 4 at 20° C., and about 2.2 parts by weight of an alkyd resin comprising the linseed oil acid radical with a viscosity of 170 seconds tested as a 50% solution in xylene in the Ford cup No. 4 at 20° C., in the presence of xylene.

References Cited in the file of this patent

UNITED STATES PATENTS

| 2,482,086 | Foster | Sept. 20, 1949 |

FOREIGN PATENTS

| 500,743 | Belgium | Feb. 15, 1951 |